United States Patent
Fujii et al.

(10) Patent No.: US 11,105,489 B2
(45) Date of Patent: Aug. 31, 2021

(54) ILLUMINATION LENS

(71) Applicant: KOITO ELECTRIC INDUSTRIES, LTD., Shizuoka (JP)

(72) Inventors: Tadashi Fujii, Aichi (JP); Jun Ito, Aichi (JP); Youmei Kaminaga, Shizuoka (JP); Yasuyo Kojima, Shizuoka (JP); Satoru Yakushiji, Shizuoka (JP)

(73) Assignee: KOITO ELECTRIC INDUSTRIES, LTD., Sizuoka (JP)

( * ) Notice: Subject to any disclaimer, the term of this patent is extended or adjusted under 35 U.S.C. 154(b) by 0 days.

(21) Appl. No.: 16/979,315

(22) PCT Filed: Mar. 8, 2019

(86) PCT No.: PCT/JP2019/009412
§ 371 (c)(1),
(2) Date: Sep. 9, 2020

(87) PCT Pub. No.: WO2019/172436
PCT Pub. Date: Sep. 12, 2019

(65) Prior Publication Data
US 2021/0062997 A1 Mar. 4, 2021

(30) Foreign Application Priority Data
Mar. 9, 2018 (JP) .............................. JP2018-043638

(51) Int. Cl.
*F21V 7/04* (2006.01)
*F21V 5/04* (2006.01)
(52) U.S. Cl.
CPC ................ *F21V 7/04* (2013.01); *F21V 5/045* (2013.01)
(58) Field of Classification Search
CPC .................................... F21V 7/04; F21V 5/045
See application file for complete search history.

(56) References Cited

U.S. PATENT DOCUMENTS

| 6,598,998 B2 * | 7/2003 | West ................... G02B 19/0071 362/307 |
| 8,231,250 B2 * | 7/2012 | Bailey ....................... F21V 5/04 362/328 |

(Continued)

FOREIGN PATENT DOCUMENTS

| JP | 2005-129354 A | 5/2005 |
| JP | 2005129354 A * | 5/2005 .............. F21V 21/30 |

(Continued)

OTHER PUBLICATIONS

International Search Report for PCT/JP2019/009412 issued by ISA/JPO dated Apr. 16, 2019.

*Primary Examiner* — Bryon T Gyllstrom
*Assistant Examiner* — Christopher E Dunay
(74) *Attorney, Agent, or Firm* — Kubotera & Associates, LLC

(57) ABSTRACT

An illumination lens includes an incident face (510), being provided in a recessed manner in a bottom apex part of the lens body (51), and receiving light from the light source (41); a reflection face (520) on the inner side of an outer periphery of the lens body (51), totally reflecting the light, having reached from the incident face (510); and an emission face (530) at the upper end of the lens body (51), emitting the light, having reached from the incident face (510) and the reflection face (520), to the outside, and the incident face (510) distributes the light, which could be directed toward the entire region of the reflection face (520), only in a predetermined range (521) within the reflection face, being adjacent to the upper end side portion, following the emission face (530), and being closer to the bottom apex part.

4 Claims, 17 Drawing Sheets

(56) References Cited

U.S. PATENT DOCUMENTS

| | | | | |
|---|---|---|---|---|
| 10,801,696 B2* | 10/2020 | Ashraf | ................. | F21V 7/0033 |
| 2014/0286016 A1* | 9/2014 | Montagne | ................. | F21V 7/09 |
| | | | | 362/296.06 |
| 2015/0338057 A1* | 11/2015 | Kim | ................. | G02F 1/133605 |
| | | | | 362/97.3 |
| 2020/0041097 A1* | 2/2020 | Dross | ..................... | F21V 5/045 |

FOREIGN PATENT DOCUMENTS

| | | | |
|---|---|---|---|
| JP | 2005-347224 A | 12/2005 | |
| JP | 2008-140625 A | 6/2008 | |
| JP | 2010-251073 A | 11/2010 | |
| JP | 2013-171802 A | 9/2013 | |
| JP | 2017-152320 A | 8/2017 | |
| WO | 2016-051863 A1 | 4/2016 | |
| WO | WO-2016051863 A1 * | 4/2016 | ................ F21V 5/04 |

\* cited by examiner

ILLUMINATION LENS

TECHNICAL FIELD

The present invention relates to an illumination lens, distributing light incident from a light source on a lens body in a predetermined direction or range, and particularly relates to an illumination lens, constituting a reading lamp installed in a seat.

BACKGROUND ART

As the conventional illumination lens, that which constitutes a reading lamp, being installed in a backrest of a seat for use in a railroad vehicle, is known, for example. Generally, the reading lamp irradiates spot light on the hands of a passenger, and it is configured such that an LED as a light source and a lens to obtain a desired spot light distribution are housed in a spherical lamp body, respectively, the lamp body being rotatably supported in a housing to allow the irradiation direction of the spot light to be adjusted. For example, refer to Patent Document 1.

Such a lens constituting a reading lamp is generally formed in a bowl shape, the bottom apex part thereof being opposed to an LED, as shown in FIG. 1 in Patent Document 1. With such a lens, the light from the LED is taken in from the incident face provided in a recessed manner in the bottom apex part thereof into the inside thereof, and is condensed with the utilization of total reflection in the entire region in the inside of the lens outer periphery, being emitted from the emission face to obtain a predetermined light distribution.

However, needless to say the case when the passenger looks the reading lamp right in front of the lens, even in the case when the passenger looks it from an oblique direction crossing the central axis of the lens, the total reflection face, which is provided inside of the outer periphery of the lens, can be seen, thereby the passenger feeling uncomfortable glare, which has presented a problem.

Then, as a technology for reducing such uncomfortable glare in a lighting fixture designed on the assumption of use of a single lens of this type, there has already been proposed a lighting fixture technology with which a cylindrical hood is provided in front of the emission face of the lens, with glare-suppressing protrusions being formed in parallel on the inner circumferential surface of the hood. For example, refer to Patent Document 2. In other words, this technology provides such a degree of depth with which the passenger is prevented from looking at the total reflection face inside of the lens through the irradiation opening located at the hood front end, and also suppresses the reflection toward the front that would be caused on the inner circumferential surface of the hood.

CITATION LIST

Patent Literature

Patent Document 1: Japanese Unexamined Patent Application Publication No. 2005-129354
Patent Document 2: Japanese Unexamined Patent Application Publication No. 2017-152320

SUMMARY OF THE INVENTION

However, with the conventional technology as disclosed in the above-described Patent Document 2, there have been problems that the addition of a hood to the lens increases the number of parts and thus the number of man-hours for mounting them, thereby an increase in cost being caused. In addition, upsizing of the entire reading lamp has required a larger space for installing it, and there has also arisen a problem with its mountability in a limited space in a seat backrest.

The present invention has been made in view of the above-mentioned problems that are associated with the conventional technology, and is intended to provide an illumination lens that can suppress uncomfortable glare with no need for adding an extra component; that can be compactly configured without bringing about an increase in size of the entire illumination device; and that also offers an improvement in mountability in a limited space therefor.

The subject matter of the present invention to achieve the above purpose is disclosed in the inventions as stated in the following respective items [1] to [5]: [1] An illumination lens, distributing light incident on a lens body from a light source in a predetermined direction or range, including:

an incident face, being provided in a recessed manner in a bottom apex part of the lens body, and receiving light from the light source, being disposed on the inner side thereof; a reflection face on the inner side of an outer periphery of the lens body, totally reflecting the light, having reached from the incident face; and an emission face at the upper end of the lens body, emitting the light, having reached from the incident face and the reflection face, to the outside, the incident face being formed so as to distribute the light, which could be directed toward the entire region of the reflection face, only in a predetermined range within the reflection face, being adjacent to the upper end side portion, following the emission face, and being closer to the bottom apex part.

[2] The illumination lens according to [1], wherein the outer periphery of the lens body is provided with a plurality of side faces at least from the bottom apex part to a halfway point of the predetermined range, the cross section orthogonal to the axis thereof having a polygonal shape, and the light, being totally reflected by the reflection face on the inner side of each side face, is emitted from the emission face in an irradiation range having an outline of the polygonal shape.

[3] The illumination lens according to [1] or [2], wherein the incident face is comprised of a first incident face, being provided by a bottom face formed about the optical axis of the light source, and a second incident face, being provided by a side face surrounding the first incident face, the light incident from the first incident face being passed through an internal region of the lens body apart from the reflection face, and emitted to the outside from the inner region, being closer to the center within the emission face, and the light incident from the second incident face being totally reflected in the predetermined range within the reflection face, and emitted to the outside from the outer region around the inner region within the emission face.

[4] The illumination lens according to any one of [1] to [3], wherein, on the outside of the outer periphery of the lens body, there is provided a mounted part for use in locating the lens body with respect to a mounting portion of a mating component of the lens body.

[5] The illumination lens according to any one of [1] to [4], wherein the lens body constitutes a reading lamp, being mounted on the seat.

Next, the functions based on the aspects of the inventions that are stated in the above items [1] to [5] will be explained.

According to the illumination lens as stated in the above item [1], the lens body distributes the light incident thereon from a light source in a predetermined direction or range. The light from the light source is efficiently taken in into the inside of the lens body from the incident face, being provided in a recessed manner in the bottom apex part of the lens body. Herein, the light from the light source is advanced straight or bent to be passed through the inside of the lens body in accordance with the angle with respect to the incident face.

A part of the light, being passed through the inside of the lens body, does not reach the reflection face, being provided on the inner side of the outer periphery of the lens body, but is passed through a region further inside thereof, being emitted to the outside from the emission face, being provided at the upper end of the lens body. In addition, the light, being not have been directed straight to the emission face, will reach the reflection face to be totally reflected to thereby be condensed toward the emission face, and then emitted from the emission face to the outside.

With such a way of light distribution by the lens body, the incident face distributes the light, which could be directed toward the entire region of the reflection face, only in a predetermined range within the reflection face, being adjacent to the upper end side portion, following the emission face, and being closer to the bottom apex. Thereby, even if the viewer obliquely views the emission face of the lens body, the predetermined range, being located in the deeper area of the reflection face, will not come into view, so long as the viewer does not intentionally peek deep into the lens body. Therefore, within the total reflection face of the lens body, only the upper portion thereof, which will not reflect the light, will normally enter the visual field, whereby uncomfortable glare can be suppressed.

According to the illumination lens as stated in the above item [2], the outer periphery of the lens body is provided with a plurality of side faces at least from the bottom apex part to a halfway point of the predetermined range, the cross section thereof having a polygonal shape. The light, being totally reflected by the reflection face, being provided on the inner side of each of the plurality of side faces, is emitted from the emission face in an irradiation range having an outline of the polygonal shape. With such a lens body, by giving, for example, a cross-sectional shape of quadrangle for the area from the bottom apex part to a halfway point of the predetermined range, distribution control to provide an illumination range of a quadrangle can be executed.

According to the illumination lens as stated in the above item [3], the incident face of the lens body is comprised of a first incident face, being provided by a bottom face formed about the optical axis of the light source, and a second incident face, being provided by a side face surrounding the first incident face. The light incident from the first incident face is passed through an internal region of the lens body apart from the reflection face, and emitted to the outside from the inner region, being closer to the center, within the emission face.

In addition, the light incident from the second incident face is totally reflected in the predetermined range within the reflection face in the lens body, and emitted to the outside from the outer region around the inner region within the emission face. With such a lens body, the light from the light source can be efficiently utilized.

According to the illumination lens as stated in the above item [4], on the outside of the outer periphery of the lens body, there is provided a mounted part for use in locating the lens body with respect to a mounting portion of a mating component of the lens body. Thereby, the illumination lens can be easily mounted in a lamp body of a reading lamp, or the like, being constituted thereby.

The above-described illumination lens is suitable as a component constituting a reading lamp, being installed in a seat, as stated in the above [5].

With the illumination lens according to the present invention, uncomfortable glare can be suppressed with no need for adding an extra component; an illumination lens can be configured compactly without bringing about an increase in size of the entire illumination device; and its mountability in a limited space can be improved.

DETAILED DESCRIPTION OF THE PREFERRED EMBODIMENTS

Hereinbelow, an embodiment representing the present invention will be explained with reference to the drawings.

FIGS. 1 to 8 show one embodiment of the present invention.

An illumination lens 50 according to the present embodiment includes a lens body 51, which distributes light incident from the light source in a predetermined direction or range. With the present embodiment, the lens body 51 alone constitutes the illumination lens 50, however, the illumination lens 50 may include the lens body 51 as a part of its structure.

<Constitution of Lens 50>

Figure 1:
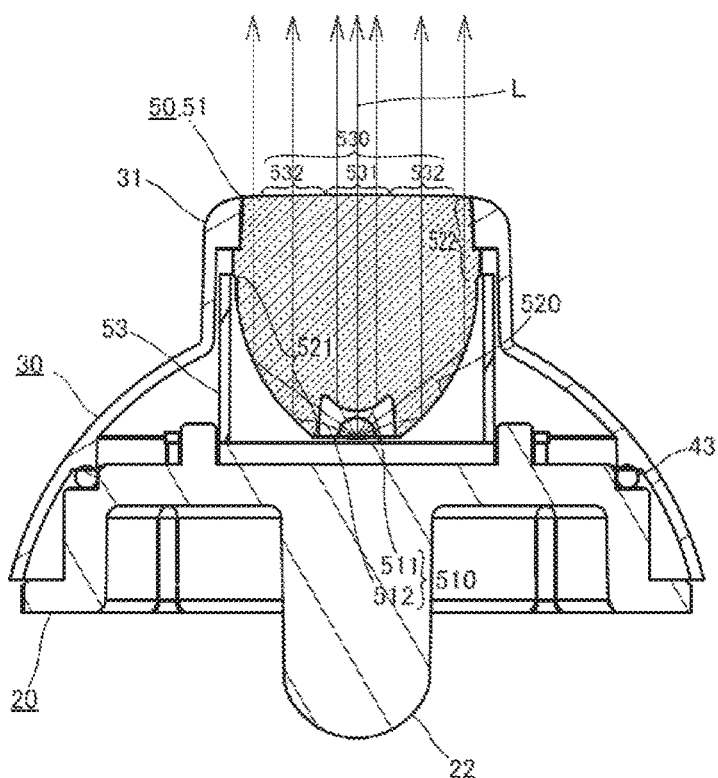
FIG. 1 is a sectional view showing light distribution control of an illumination lens in a lamp body of a reading lamp according to an embodiment of the present invention.
Figure 2:
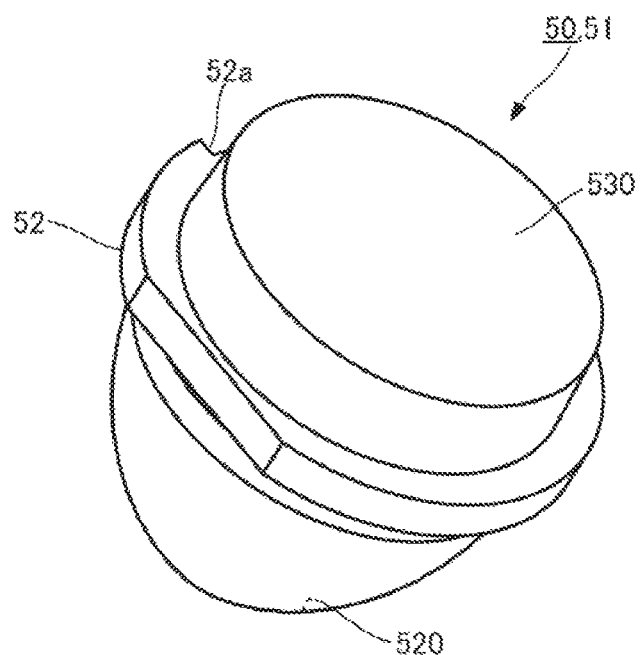
FIG. 2 is a perspective view showing an illumination lens according to an embodiment of the present invention.
Figure 3:
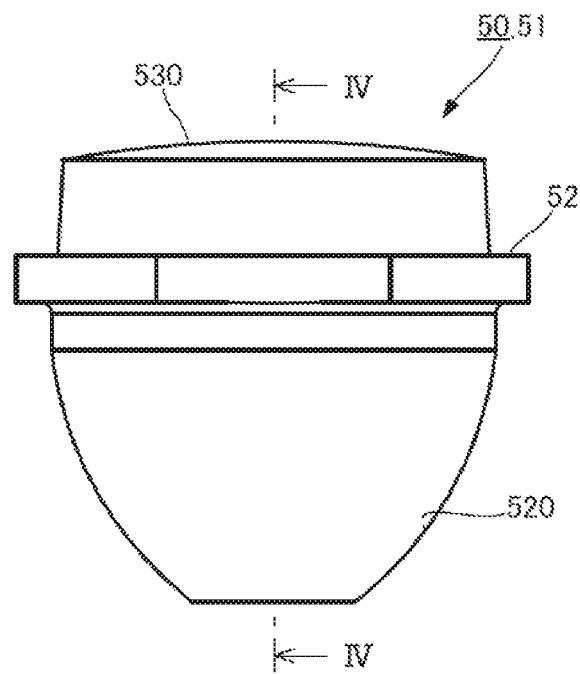
FIG. 3 is a front view showing an illumination lens according to an embodiment of the present invention; for convenience of explanation, the front is defined as a state of the lens when the emission face thereof is directed upward.

As shown in FIG. 1 to FIG. 8, the lens body 51, which is the illumination lens 50 itself, is in the shape of a solid bowl as shown in the figure, and is integrally formed of a transparent material, such as an acrylic resin or polycarbonate. The lens body 51 includes an incident face 510, which is provided in a recessed manner in a bottom apex part thereof, and which receives the light from an LED 41, the LED 41 being disposed opposite to the lens body 51 on the inner side of the bottom apex part as a light source (as shown in FIG. 1); a reflection face 520, which is provided on the inner side of the outer periphery, totally reflecting the light, having reached from the incident face 510; and an emission face 530, which is provided at the upper end of the lens body 51, being opposed to the incident face 510 and emits the light, having reached from the reflection face 520, to the outside.

As shown in FIG. 1, in the lens body 51, the incident face 510, being located in the bottom apex part formed in a bowl shape, is comprised of a first incident face 511, providing a bottom face formed about the optical axis of the LED 41, and a second incident face 512, providing a side face surrounding the first incident face 511. The first incident face 511 is formed concentrically with the LED 41 about the optical axis L thereof, being provided with an arcuate section convex toward the LED 41. With the first incident face 511, the light from the LED 41 is advanced straight or bent in the lens body 51 to be passed through an internal region of the lens body 51 apart from the reflection face 520, and directed toward the inner region 531, being closer to the center, within the emission face 530.

The second incident face 512 is disposed such that it surrounds the emitting side of the LED 41, being formed into a tapered section, thereby the diameter of the opening of the recessed part in the bottom apex part being made slightly larger than that of the outer periphery of the first incident face 511. The second incident face 512 could be formed so as to refract the light from the LED 41 toward the entire region of the reflection face 520, but, it is formed so as to distribute such light only in a later-described predetermined range 521 within the reflection face 520, being adjacent to the upper end side portion (the upper portion 522), following the emission face 530, and being closer to the bottom apex part. Such light distribution control is previously established by setting the tapered angle of the second incident face 512.

The reflection face 520 is provided as a critical angle reflection face with which the inner side of the outer periphery of the lens body 51 can totally reflect the light incident from the second incident face 512 toward the outer region 532, being closer to the outside, within the emission face 530. However, as described above, the light incident from the second incident face 512 will not reach the entire area of the reflection face 520, but will limitedly reach the predetermined range 521, being closer to the bottom apex part, within the reflection face 520. Herein, specifically, the predetermined range 521 corresponds to a part of the reflection face 520 the level of which ranges from the bottom apex part to, for example, two thirds of the overall height of the lens body 51.

Figure 4:
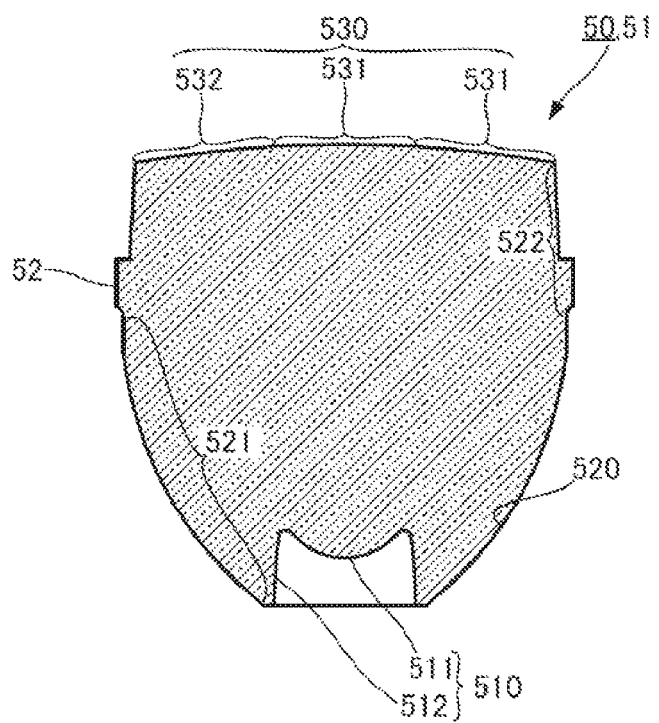
FIG. 4 is a sectional view given along a line IV-IV in FIG. 3.
Figure 5:
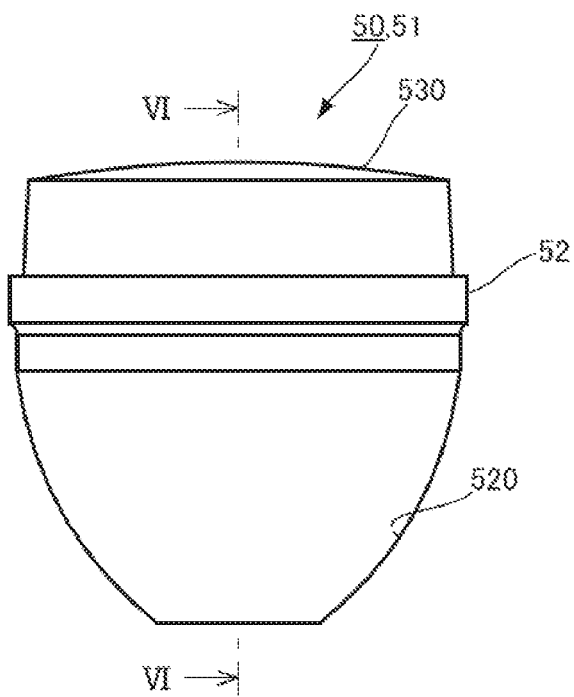
FIG. 5 is a right side view showing an illumination lens according to an embodiment of the present invention.
Figure 6:
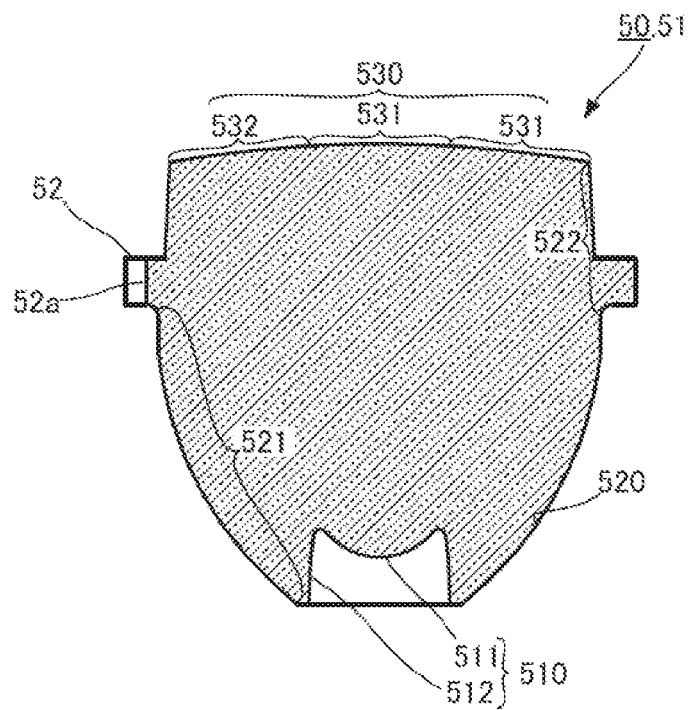
FIG. 6 is a sectional view given along a line VI-VI in FIG. 5.
Figure 7:
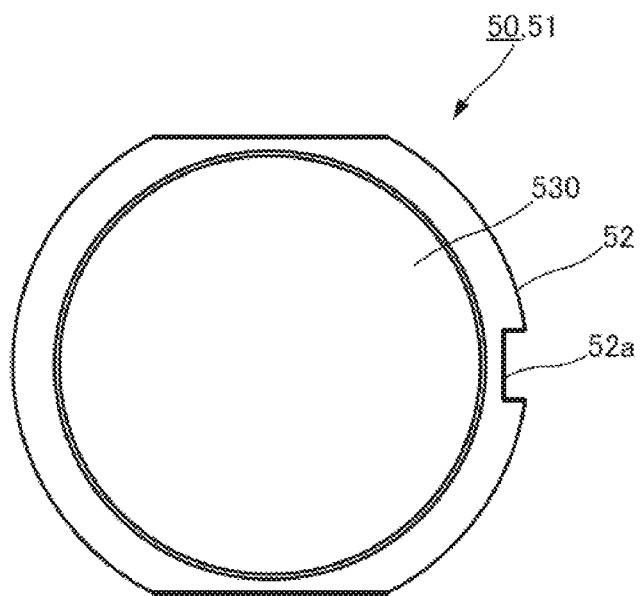
FIG. 7 is a plan view showing an illumination lens according to an embodiment of the present invention.
Figure 8:
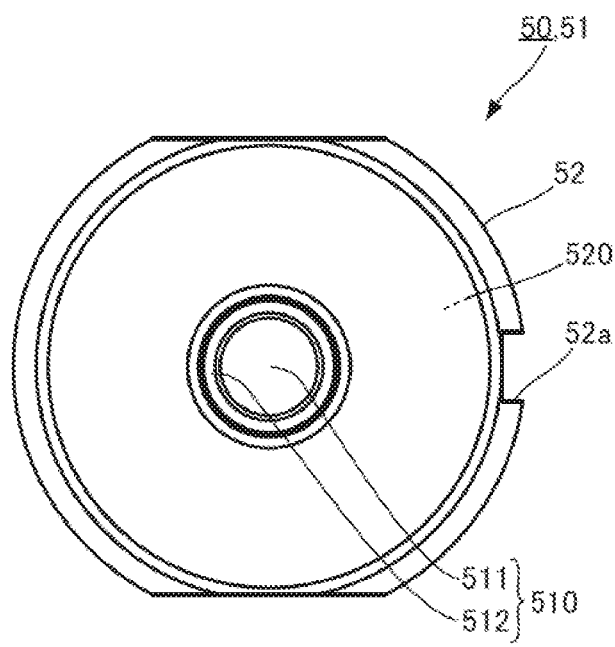
FIG. 8 is a bottom view showing an illumination lens according to an embodiment of the present invention.
Figure 9:
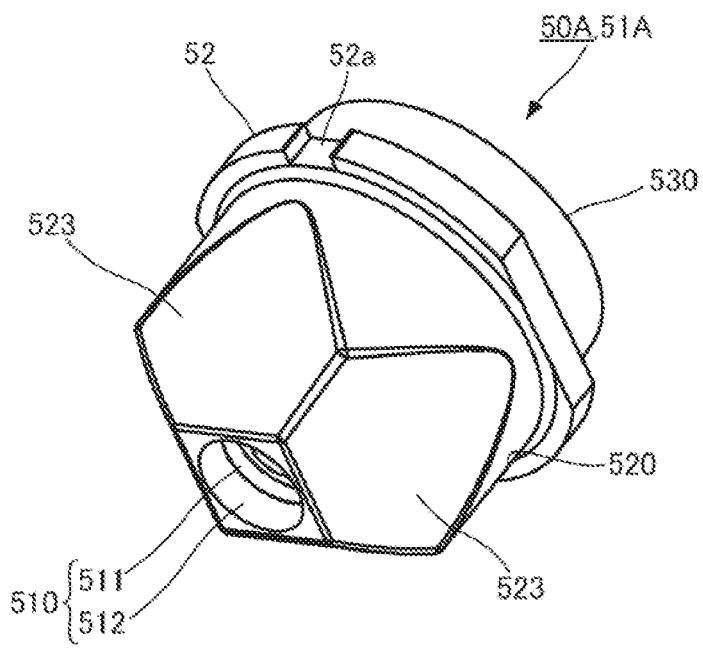
FIG. 9 is a perspective view showing another illumination lens according to an embodiment of the present invention.
Figure 10:
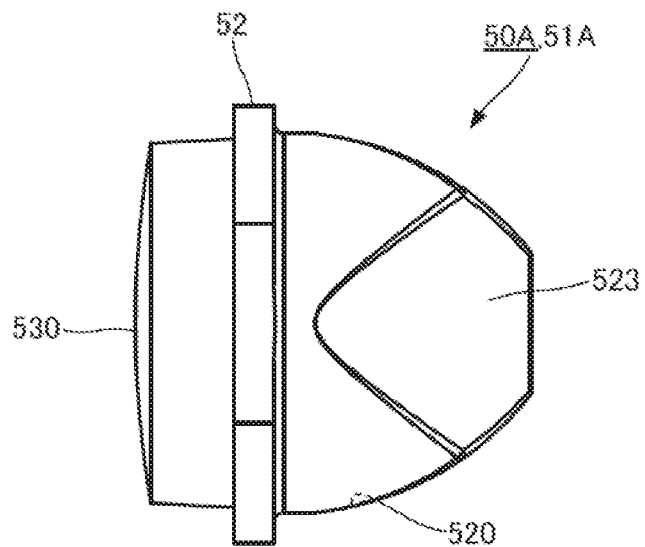
FIG. 10 is a front view showing another illumination lens according to an embodiment of the present invention; for convenience of explanation, the front is defined as a state of the lens when the emission face thereof is directed leftward.
Figure 11:
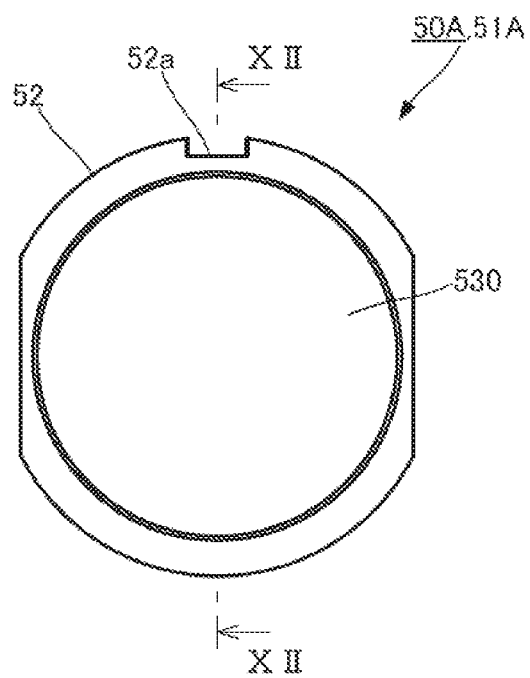
FIG. 11 is a left side view showing another illumination lens according to an embodiment of the present invention.
Figure 12:
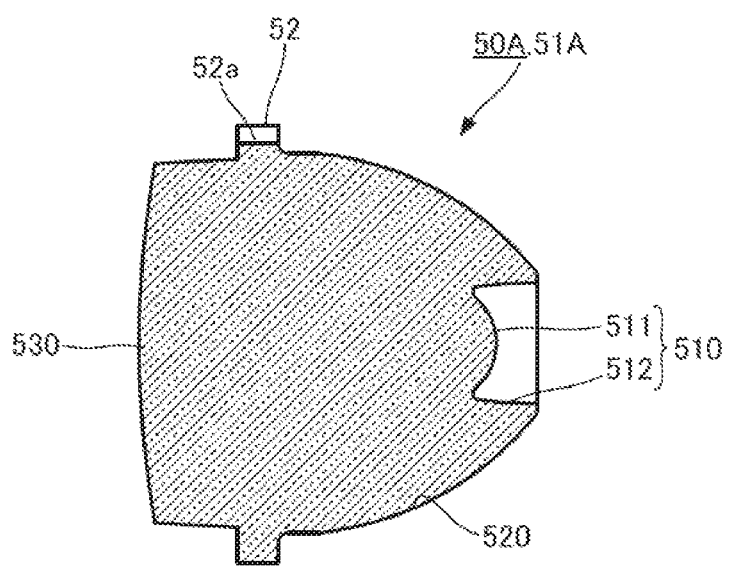
FIG. 12 is a sectional view given along a line XII-XII in FIG. 11.
Figure 13:
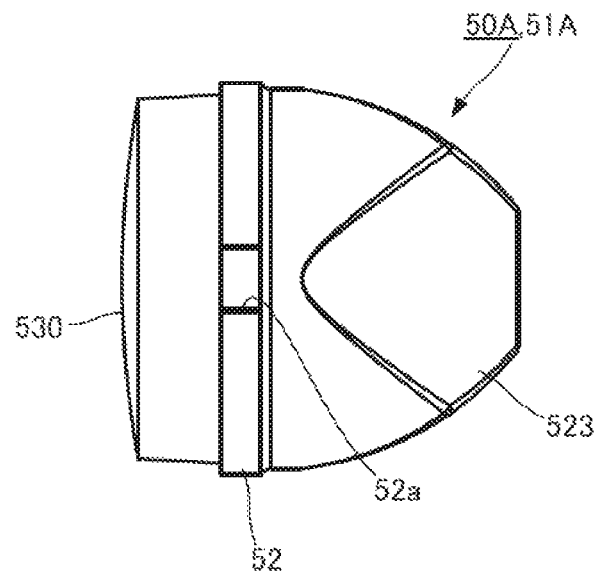
FIG. 13 is a plan view showing another illumination lens according to an embodiment of the present invention.
Figure 14:
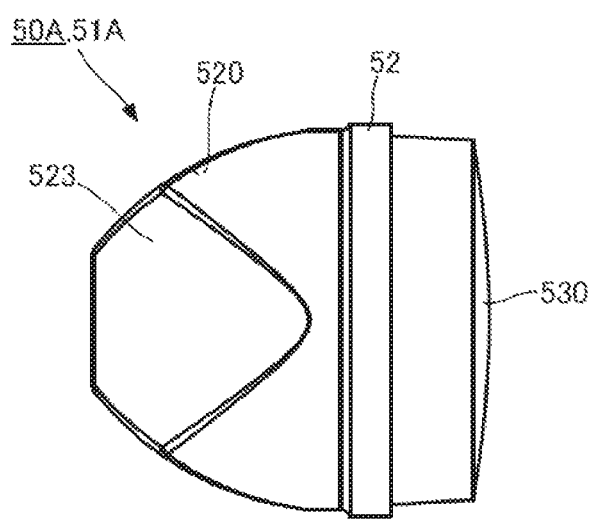
FIG. 14 is a bottom view showing another illumination lens according to an embodiment of the present invention.
Figure 15:
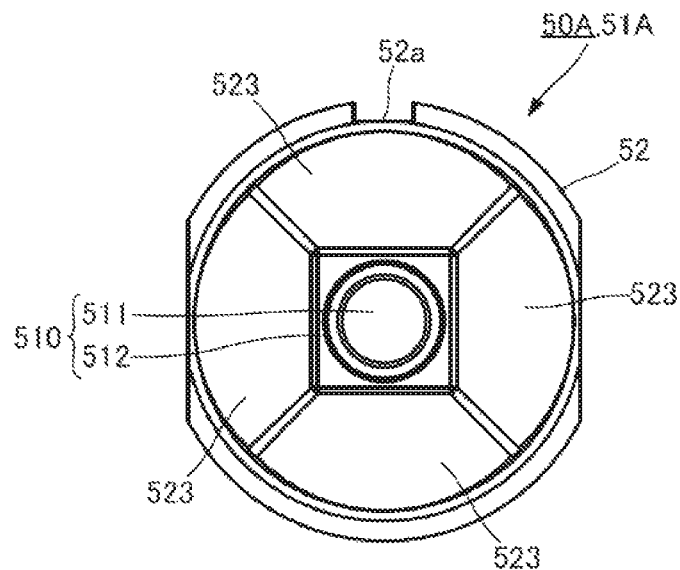
FIG. 15 is a back view showing another illumination lens according to an embodiment of the present invention.

The reflection face 520 provides a series of slanted curved surfaces, however, by making a specific design of the curved geometry and the inclination angle of the predetermined range 521, the light, having been totally reflected, can be caused to be irradiated from the emission face 530 in a desired direction or with a desired light distribution characteristic. In the present embodiment, as shown in FIG. 1, the predetermined range 521 of the reflection face 520 is provided as a series of slanted curved surfaces, causing the reflected light to be condensed in a direction approximately in parallel with the optical axis L of the LED 41. In FIG. 1, FIG. 4, and FIG. 6, the predetermined range 521 and the upper portion 522 located thereabove of the reflection face 520 are shown with a symbol being given on the right or left side alone, however, it should be noted that the portion to which the symbol refers extends over the entire periphery to the opposite side (the left or right side in the figure) where no symbol is given.

The emission face 530 is formed concentrically with the LED 41 about the optical axis L thereof, being provided with a curved section slightly bulged toward the outside, however, the emission face 530 may be formed in a flat surface. In the light distribution control in the present embodiment, the emission face 530 is divided into two regions, i.e., the inner region 531, which is closer to the center, and the outer region 532 therearound, however, such division is not provided visibly. The inner region 531 provides a region where the light which has been made incident from the first incident face 511 is emitted directly to the outside. The outer region 532 provides a region where the light which has been made incident from the second incident face 512 and totally reflected in the predetermined range 521 of the reflection face 520 is emitted to the outside.

Figure 16:
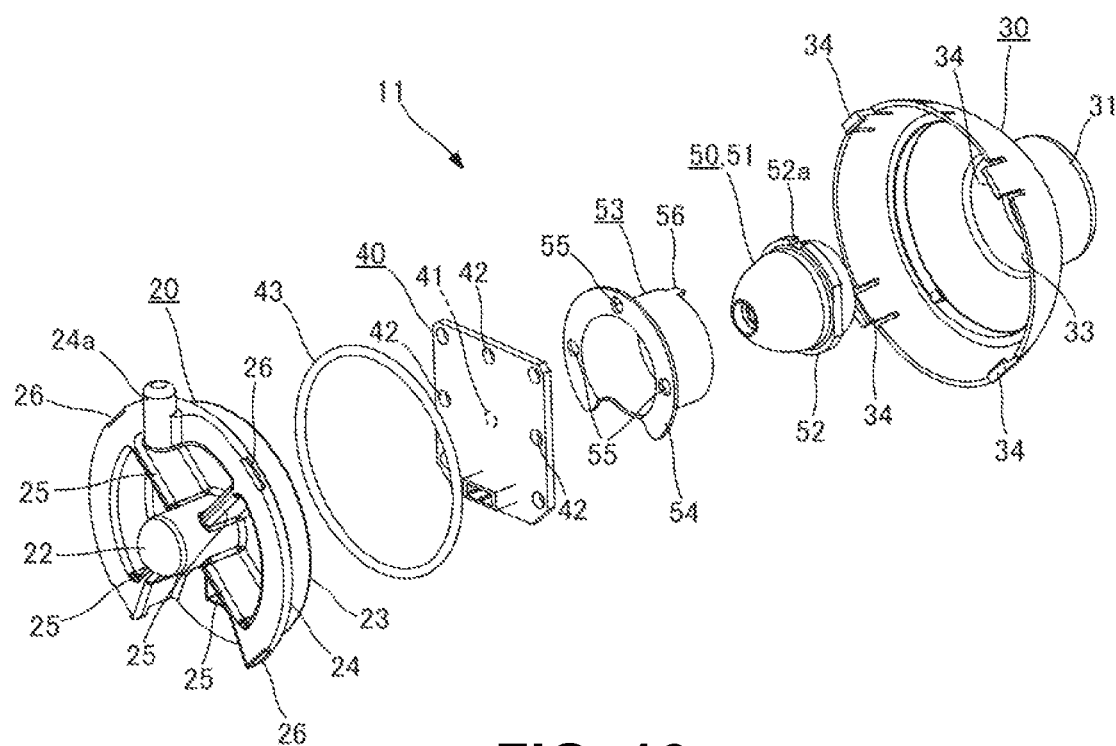
FIG. 16 is a perspective view of a lamp body of a reading lamp according to an embodiment of the present invention, being disassembled and shown from the back side.
Figure 17:
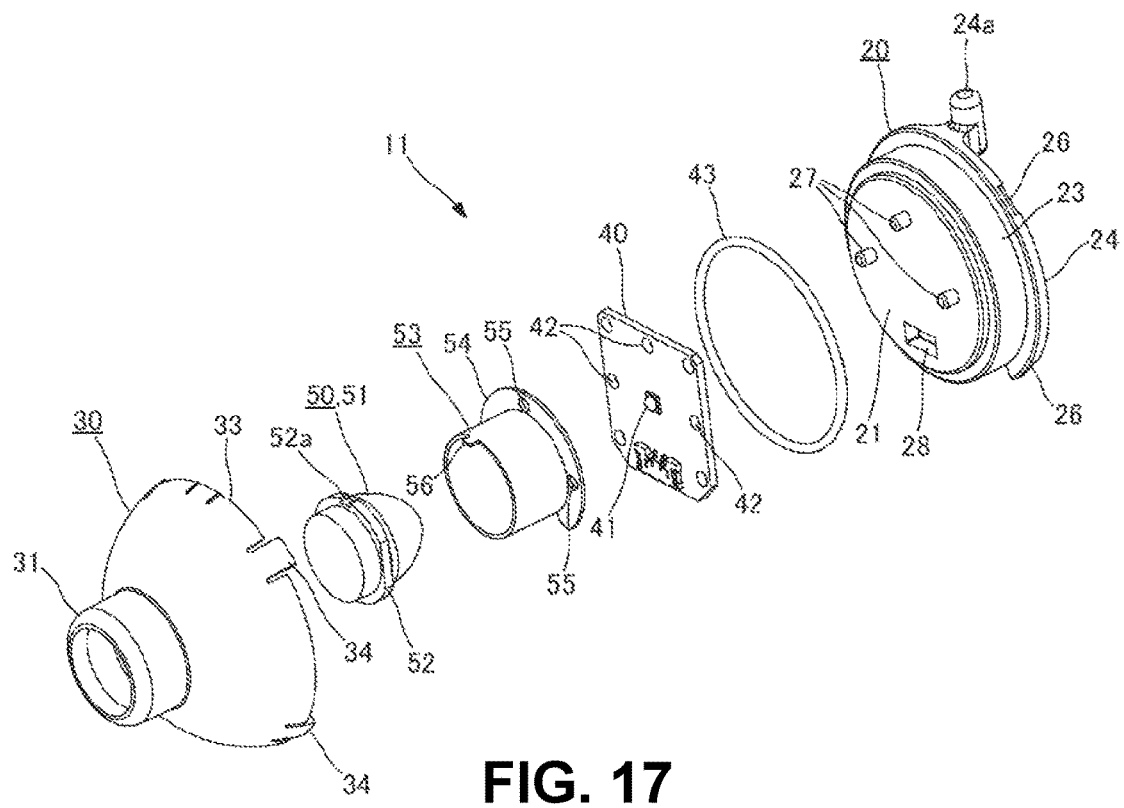
FIG. 17 is a perspective view of a lamp body of a reading lamp according to an embodiment of the present invention, being disassembled and shown from the front side.
Figure 18:
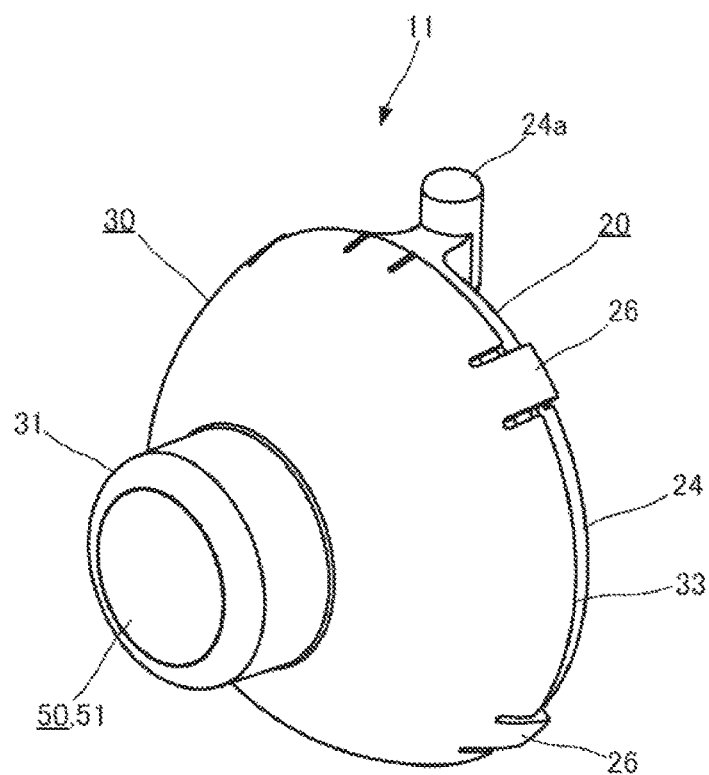
FIG. 18 is a perspective view of a lamp body of a reading lamp according to an embodiment of the present invention, being shown from the front side.
Figure 19:
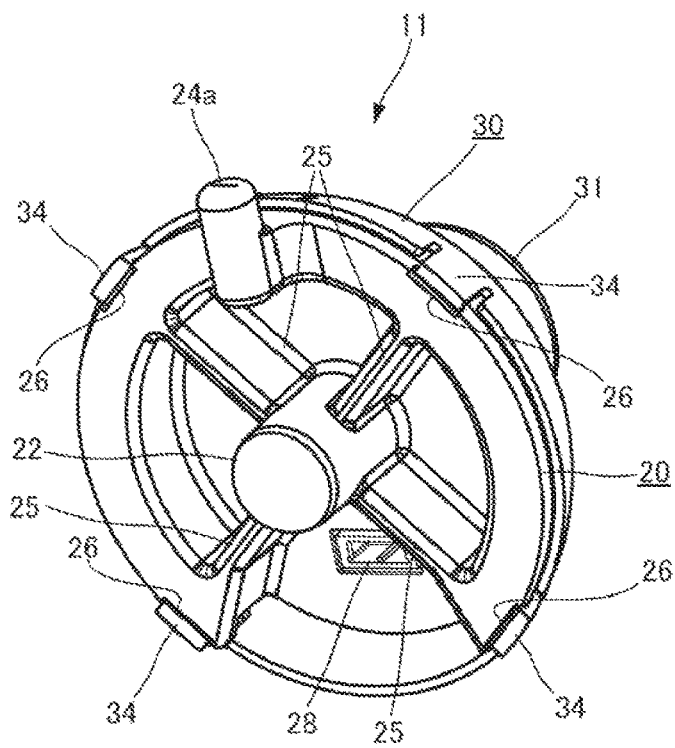
FIG. 19 is a perspective view of a lamp body of a reading lamp according to an embodiment of the present invention, being shown from the back side.
Figure 20:
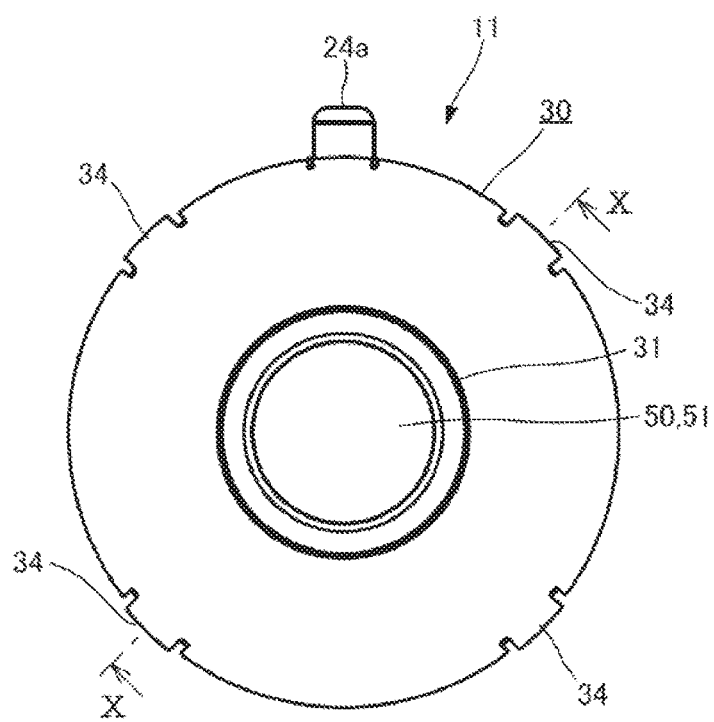
FIG. 20 is a front view showing a lamp body of a reading lamp according to an embodiment of the present invention.
Figure 21:
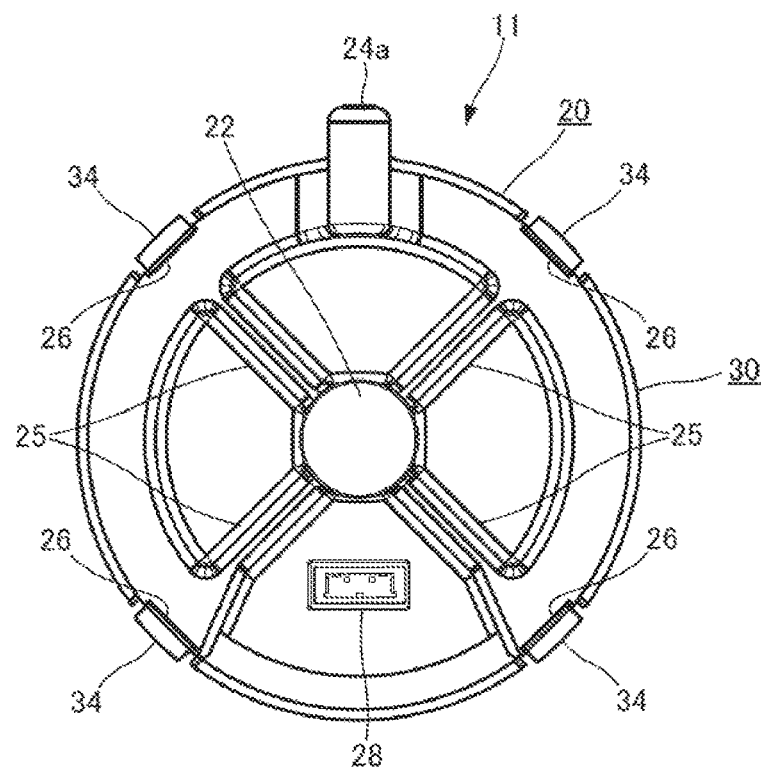
FIG. 21 is a back view showing a lamp body of a reading lamp according to an embodiment of the present invention.
Figure 22:
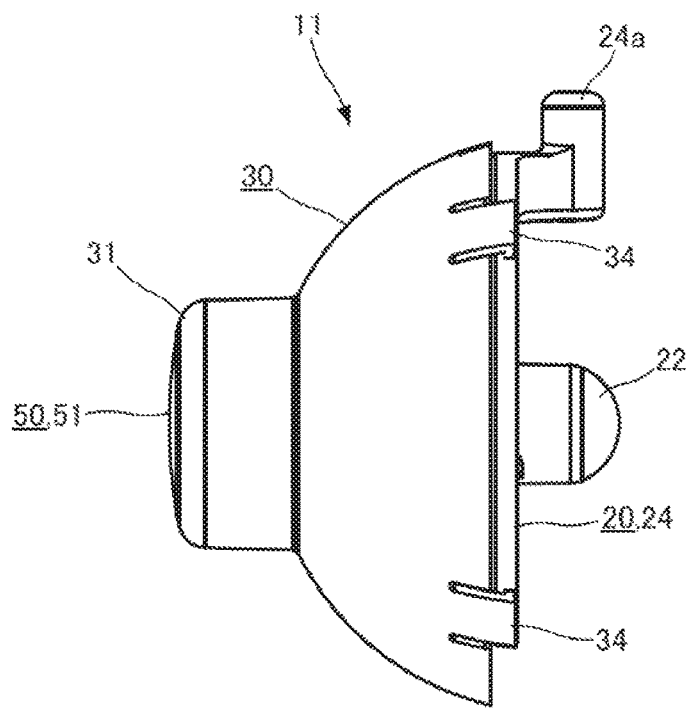
FIG. 22 is a right side view showing a lamp body of a reading lamp according to an embodiment of the present invention.
Figure 23:
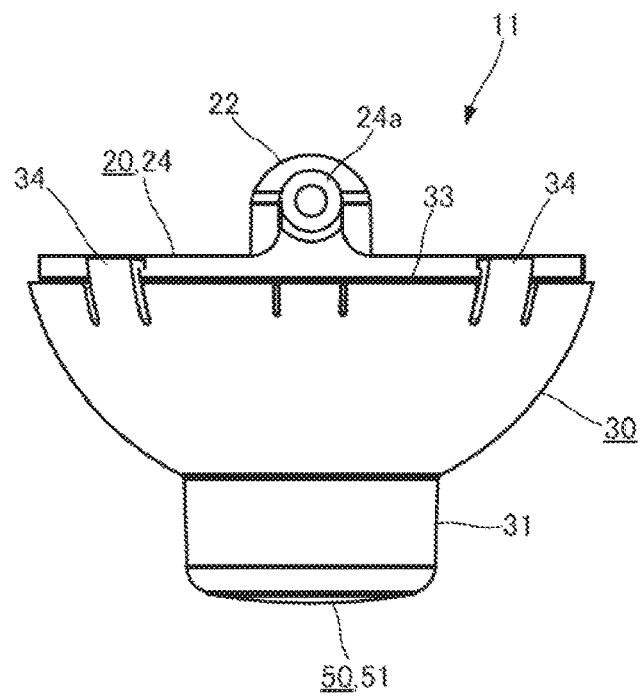
FIG. 23 is a plan view showing a lamp body of a reading lamp according to an embodiment of the present invention.
Figure 24:
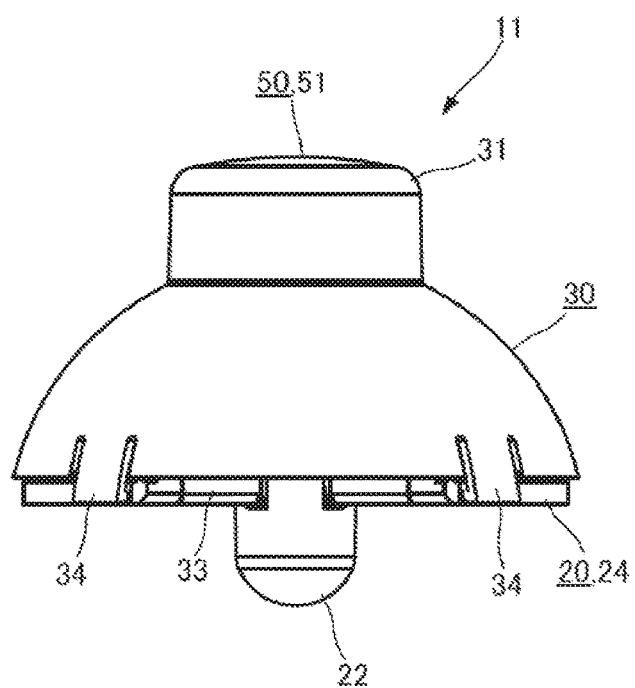
FIG. 24 is a bottom view showing a lamp body of a reading lamp according to an embodiment of the present invention.

With the lamp body 11 of the later-described reading lamp 10, as shown in FIG. 16 and FIG. 17, the illumination lens 50 is disposed ahead of the LED 41 through the holder 53. Herein, the holder 53 is a member to hold the illumination lens 50, being in a cylindrical shape on the whole and provided with a flange 54 around the opening at the rear end, and is integrally formed of a synthetic resin, such as a plastic material, by using a mold. The holder 53 is located with a later-described LED substrate 40 by means of a locating means. More specifically, as shown in FIG. 16 and FIG. 17, the flange 54 of the holder 53 is provided with a hole part 55, into which a projection 27 of a base 20 is fitted.

On the outside of outer periphery of the lens body 51, there is provided a shoulder part (mounted part) 52 to be located on the edge (mounting part) of the opening at the front end of the holder 53. Within the reflection face 520 on the inner side of the outer periphery of the lens body 51, the lower portion thereof, which is located closer to the bottom apex part than the shoulder part 52, provides the predetermined range 521. Strictly speaking, even the reflection face 520 is not capable of maintaining the total reflection in a portion thereof in which the shoulder part 52 is provided.

Within the outer periphery of the lens body 51, the upper portion thereof, including the shoulder part 52, is fitted to the front of the inner periphery of the opening part 31 of a later-described cover 30, with the top face of the shoulder part 52 being engaged with a shoulder part 32, which is provided on the inner periphery of the opening part 31. In such a state, the lens body 51 is held between the holder 53 and the opening part 31. The lens body 51 is not contact with the holder 53 and the cover 30, except for the shoulder part 52 and the outer periphery, being located thereabove.

In the case where, with the illumination lens 50, the orientation in which it is to be assembled with a later-described base 20 has been predetermined, the illumination lens 50 and the holder 53 can be provided with means for mutually regulating the assembling orientation, 52a and 56. More specifically, as shown in FIG. 16, a notch 52a is provided for the illumination lens 50 in one place in the shoulder part 52. On the other hand, at the opening end of the holder 53, a projection 56, which is matched to the notch 52a, is provided in one place to assure the proper orientation of the notch 52a in assembling.

Any assembling orientation in which the projection 56 is not matched to the notch 52a will cause the projection 56 to interfere with the shoulder part 52 of the illumination lens 50, thereby the illumination lens 50 being unable to be assembled with the holder 53. With the illumination lens 50 according to the present embodiment, the lens body 51 has the same sectional shape over the entire periphery except for the shoulder part 52, and thus the orientation thereof is not particularly specified, however, for a later-described illumination lens 50A, the notch 52a allows the orientation of the illumination lens 50A to be easily determined, whereby assembling in an improper orientation can be prevented.

<Constitution of Another Illumination Lens 50A>

FIG. 9 to FIG. 15 show an illumination lens 50A according to a modification, which, although the basic geometry and size thereof are common to those of the above-described illumination lens 50, is provided with a reflection face 520A, being different from that of the reflection face 520. Note that the same potions as those of the illumination lens 50 are provided with the same numerals, respectively, and repeated explanation thereof will be omitted here. The illumination lens 50A according to the present modification is also disposed ahead of the LED 41 through the same holder 53, being held in the lamp body 11.

With the outer periphery of the lens body 51A of the illumination lens 50A, the area at least from the bottom apex part to a halfway point of the predetermined range 521 is provided with a plurality of side faces 523, with which the cross section orthogonal to the axis thereof has a polygonal shape. Then, the light, being totally reflected by the reflection face 520A, which is provided on the inner side of each side face 523, is emitted from the emission face 530 in an irradiation range having an outline of the polygonal shape.

More specifically, the outer periphery of the lens body 51A is formed such that it has four side faces 523, being inclined at an equal angle from the bottom apex part. With such reflection face 520A, which is provided on the inner side of each side face 523, the light, having reached from the second incident face 512 of the incident face 510, can be condensed into a quadrangle (square), whereby the light distribution from the emission face 530 can be performed for a quadrangle (square).

In the present modification, the illumination lens 50A is configured to have four side faces 523, being inclined at an equal angle from the bottom apex part within the outer periphery thereof toward four directions, however, the specific configuration of the illumination lens 50A is not limited to that of the illumination lens 50A according to the present modification, and the cross section of the lens body 51 may be specified to have a triangular shape or a five- or more-sided polygonal shape, for example.

<About Reading Lamp 10>

Next, as shown in FIG. 16 to FIG. 34, a reading lamp 10, including the above-described illumination lens 50, 50A as a component, will be explained. The reading lamp 10 according to the present embodiment provides a lighting fixture, which includes a lamp body 11, having an illumination lens 50, 50A and a light source, the lamp body 11 being mounted to a seat 1 through a bracket 60.

Hereinafter, the reading lamp 10, which has been provided for the seat 1 in a railroad vehicle, will be explained, being used as an example.

<Constitution of Lamp Body 11>

As shown in FIG. 16 and FIG. 17, the lamp body 11, constituting a critical part of the reading lamp 10, is provided by assembling the base 20, with which the light source is disposed on the front side, with the cover 30, which surrounds the light source on the front side of the base 20, except for the irradiation range. The lamp body 11 is provided with a leg part, which is protruded on the side opposite to the emitting side of the light source, the tip thereof being engaged with a receiving part 65, being provided for a later-described bracket 60 (see FIG. 29). The lamp body 11 is supported by the bracket 60 such that the irradiation direction of the light source (the angle of the optical axis) can be adjusted with the tip of the leg part 22 being used as a fulcrum.

The base 20 has a disk-like shape on the whole, being integrally formed of a metal, such as an aluminum alloy by using such a method as die casting. The base 20 is made of a metal, being excellent in thermal conductivity, thereby serving also as a heat sink for dissipating the heat of the light source. More specifically, the base 20 has a disk-like shape on the front side, providing a mounting face 21, while being opened on the back side to have a shallow-bottom dish-like shape, the leg part 22 being provided at the center on the back side of the mounting face 21.

The leg part 22 is formed in a shaft-like shape with the tip thereof having a semispherical shape, being protruded toward the back side perpendicularly with respect to the mounting face. The tip of the leg part 22 is protruded toward the outside from the end edge of the peripheral wall 23 surrounding a space on the back side of the mounting face 21 (from the reference surface on the back side of the base 20) by an amount equal to the height of the peripheral wall 23 when viewed from the side. In addition, the end edge of the peripheral wall 23 is provided with a flange 24, being extended sidewise.

On the back side of the base 20, there is radially provided a rib 25, being extended four directions from the leg part 22 as the center and joined to the inner side of the peripheral wall 23. Each rib 25 serves not only to reinforce the leg part 22 and the peripheral wall 23, but also to function as a heat dissipation fin. In FIG. 16, in one section between two adjacent ribs 25, the peripheral wall 23 and the flange 24 are notched for use as a mounting space where related components, such as a power circuit board and a light source control circuit board, are disposed. In one portion of the flange 24, which is opposed to this mounting space, there is provided a locating pin 24a, being protruded sidewise.

Figure 25:
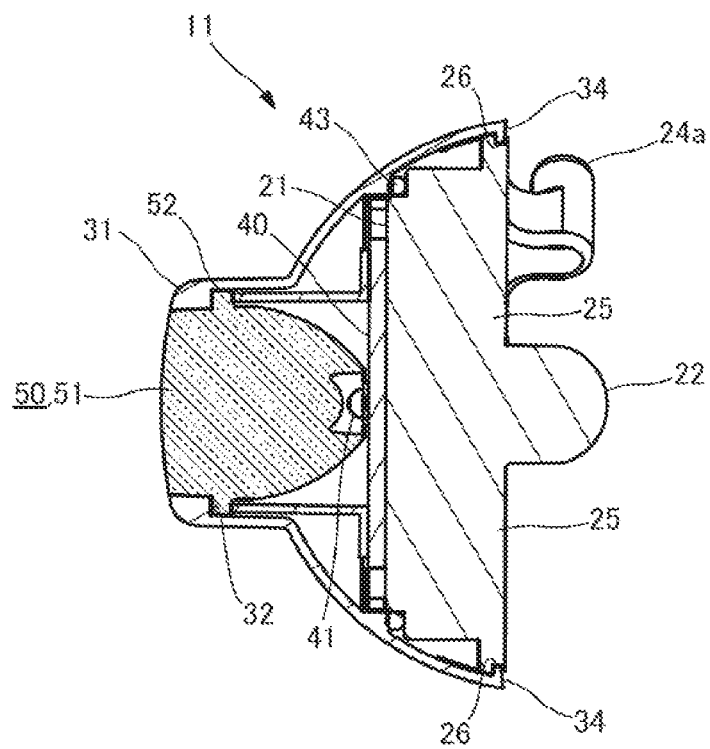
FIG. 25 is a sectional view given along a line X-X in FIG. 20.

In addition, the base 20 is provided with a later-described engaged part 26, which is used for snap-fit engagement with the cover 30. The engaged part 26 is disposed along the outer periphery edge of the flange 24 in each location where the rib 25 is joined thereto. In the present embodiment, four engaged parts 26 are provided in correspondence to the four ribs 25. More specifically, as shown in FIG. 25, on the outer periphery edge of the flange 24, the engaged part 26 is provided as an engaged groove, which is matched to the tip of an engaging claw of a later-described engaging part 34 of the cover 30.

Next, the cover 30 is in a semispherical bowl-shape on the whole, being integrally formed of a synthetic resin, such as a plastic material, by using a mold. The cover 30 is formed of a synthetic resin, which is elastically deformable, and thus the later-described engaging part 34 can be elastically deformed. In the apex part of the outer periphery of the cover 30, an opening part 31 for irradiation, matching to the irradiation range of the light source, is provided, being protruded in a cylinder-like manner. As shown in FIG. 25, in the inner periphery of the opening part 31, there is formed a shoulder part 32, with which the diameter of the inner periphery is contracted toward the tip.

The cover 30 is assembled to the base 20 so as to cover the front side thereof. More specifically, an opening edge 33, which is the outermost periphery of the cover 30, is assembled to the base 20 so as to be fitted to the outer periphery edge of the flange 24, and they are fixed to each other by snap-fit engaging the engaging part 34, being provided for the cover 30, with the engaged part 26, being provided for the base 20. Therefore, the inside diameter of the opening edge 33 of the cover 30 is designed to be that which is tightly matched to the outside diameter of the flange 24 of the base 20.

The cover 30 is provided with the engaging part 34, which is to be snap-fit engaged with the base 20. Along the opening edge 33, there are arranged a plurality of engaging part 34, being disposed in the locations where they are matched to the engaged parts 26. In the present embodiment, in correspondence with the four engaged parts 26, the same number of engaging parts 34 are provided. More specifically, as shown in FIG. 25, the engaging part 34 is provided along the opening edge 33 as an engaging claw, being fitted to the engaged groove, which is the engaged part 26.

As shown in FIG. 16, the engaging claw, which is the engaging part 34, is formed such that the tip end of the claw is protruded toward the inside of the opening edge 33. Herein, the back of the tip end is formed in a tapered shape such that it can elastically get on the engaged groove, which is the engaged part 26. In addition, on both sides of the engaging part 34, a pair of slits are notched such that a part of the outer periphery including the engaging part 34 can be elastically deformed toward the outside.

<Constitution of Light Source>

Next, the light source, which is disposed on the front side of the base 20 in the lamp body 11, will be explained. The light source is constituted by a single LED 41, which is a semiconductor light-emitting element, being mounted on an LED substrate 40. The LED substrate 40 is formed in a square having a size allowing it to be accommodated within the area of the mounting face 21 of the base 20. As the LED 41, an LED chip of surface-mounting type is suitable, for example. Since the LED chip of such type is well known, the detailed explanation thereof will be omitted here. Simply put, it emits light within a predetermined angle of irradiation range about the optical axis thereof perpendicular to the LED substrate 40. The luminescent color can be arbitrarily selected to suit to the application and type of the lighting fixture, however, for the reading lamp, white color is suitable.

The LED 41 is required to be held in a predetermined location on the front side of the base 20 in the lamp body 11. Then, on the mounting face 21 of the base 20, there is provided a locating means for locating the LED substrate 40 when disposing it. More specifically, as shown in FIG. 17, on the mounting face 21, three projections 27 are provided. On the other hand, in the peripheral area of the LED substrate 40, there are provided hole parts 42, into which the projections 27 are fitted, respectively. In the base 20, an insertion hole 28 for inserting a wiring to supply power to the LED substrate 40 from the outside power supply is also provided (see FIG. 17).

Between the mounting face 21 of the base 20 and the LED substrate 40, a packing 43 in a ring shape is interposed, and the mounting face 21 of the base 20 and the LED substrate 40 are tightly contacted with each other through the packing 43. The packing 43 is integrally formed of an elastic material, such as a non-conductive silicone rubber. The packing 43 is a member for protecting the circuit on the LED substrate 41 as a cushioning material, and for improving the dissipation performance by enhancing the adhesion between the base 20 and the LED substrate 40.

<Entire Constitution of Bracket 60>

Figure 34:
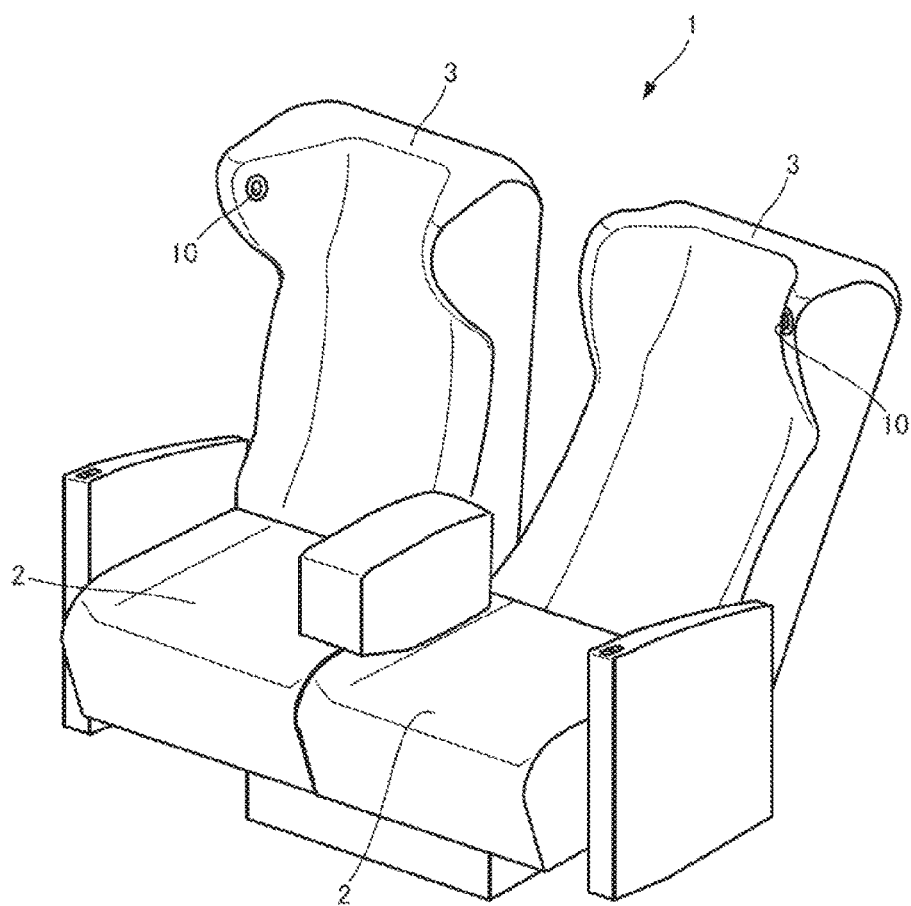
FIG. 34 is a perspective view showing a pair of seats each provided with a reading lamp according to an embodiment of the present invention.

The lamp body 11, which provides a critical part of the above-described reading lamp 10, is mounted to the seat 1 through the bracket 60. Herein, the seat 1 is, for example, a two-occupant seat for use in a railroad vehicle, with which seat parts 2 and backrests 3 for two persons are arranged side by side in a line, as shown in FIG. 34, and of both side parts on the upper end side of the respective backrests 3, on the side part, being located on the outer side of the seat, the reading lamp 10 is provided. The reading lamp 10 is mounted to a frame in the inside of the backrest 3, the opening part 31 thereof and the surrounding portion thereof being exposed to the outside of the cover of the backrest 3.

As shown in FIG. 26 to FIG. 33, the bracket 60 displaceably holds the lamp body 11, having a housing part 61 for accommodating the lamp body 11 on the inner side thereof, and mounting parts 66 and 67 for fixing it to the frame in the inside of the backrest 3. The housing part 61 is approximately in a cylindrical shape, surrounding the entire lamp body 11, except for the opening part 31, which provides the irradiation face of the lamp body 11, and is formed of such a material as a metal.

The housing part 61 is comprised of an outer periphery wall 62, being approximately in a cylindrical shape, a front wall 63, covering the front-side opening of the outer periphery wall 62, and a back wall 64, walling up the back-face side opening of the outer periphery wall 62. The inside diameter of the outer periphery wall 62 is set at a size that allows the lamp body 11 to be accommodated so as to be displaceable. The front wall 63 is formed such that the outer periphery of the cover 30 is slidably butted against the inner side, and is provided with a guide opening 63a, into which the opening part 31 is movably inserted.

The guide opening 63a is extended in a vertical direction, the inside diameter and the lateral width of the guide opening 63a at the upper and lower ends thereof being designed to be slightly larger than the outside diameter of the opening part 31. In addition, the peripheral edge of the guide opening 63a may be provided as another part made of a synthetic resin rather than a metal. Further, the inner side of the peripheral edge of the guide opening 63a may be provided with a holding member made of such a material as moquette, which is to be elastically butted against the outer periphery of the cover 30. When the lamp body 11 is to be accommodated in the housing part 61, the front wall 63 can be mounted later.

Figure 29:
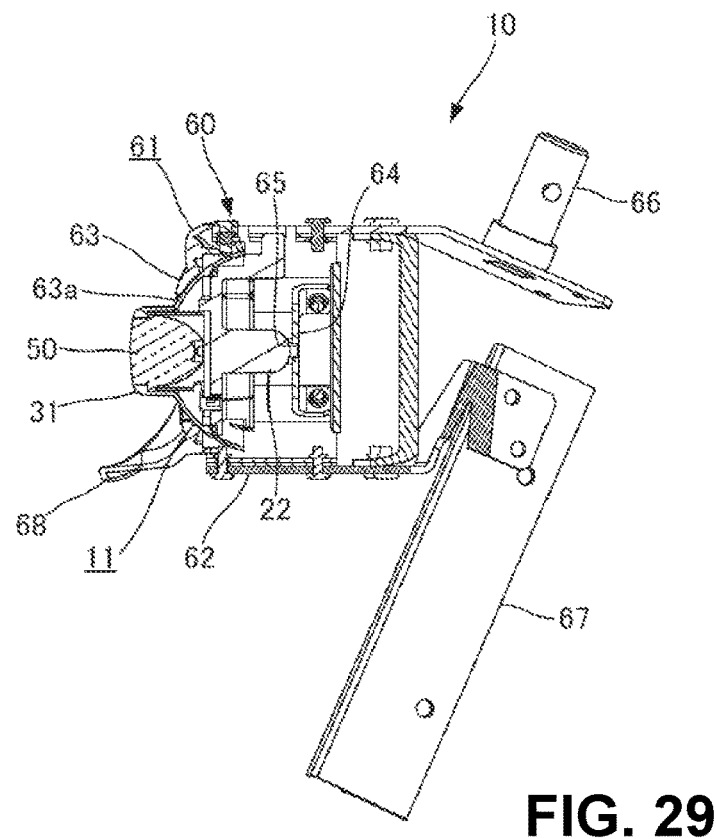
FIG. 29 is a sectional view given along a line XXIX-XXIX in FIG. 27.
Figure 30:
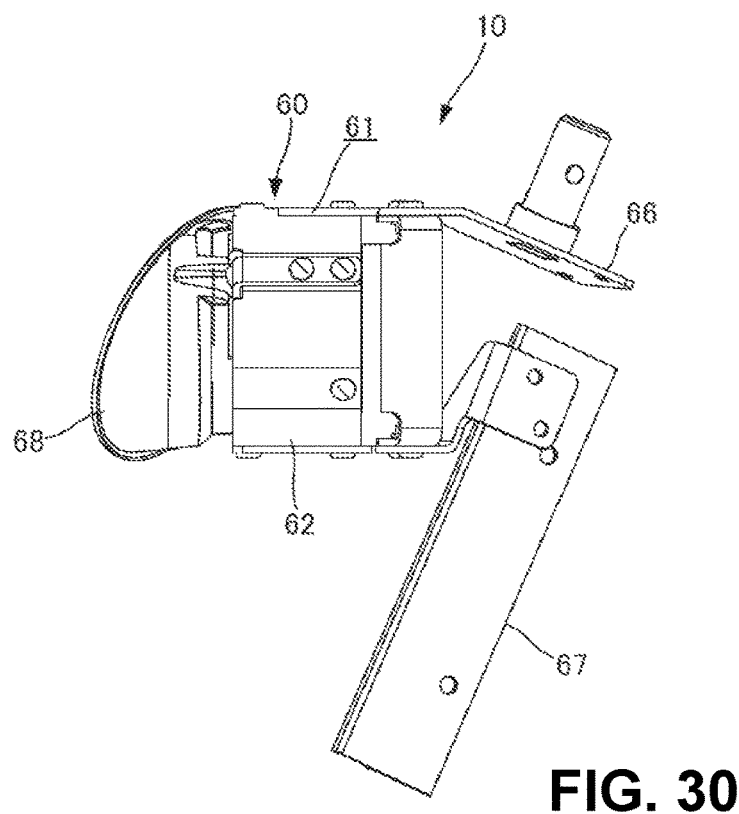
FIG. 30 is a left side view showing a bracket of a reading lamp according to an embodiment of the present invention.
Figure 31:
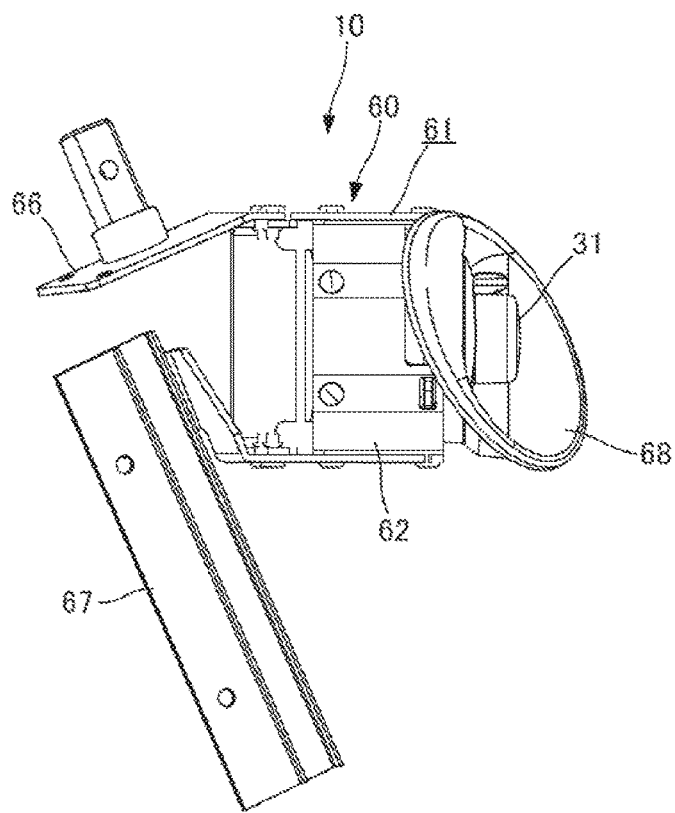
FIG. 31 is a right side view showing a bracket of a reading lamp according to an embodiment of the present invention.
Figure 32:
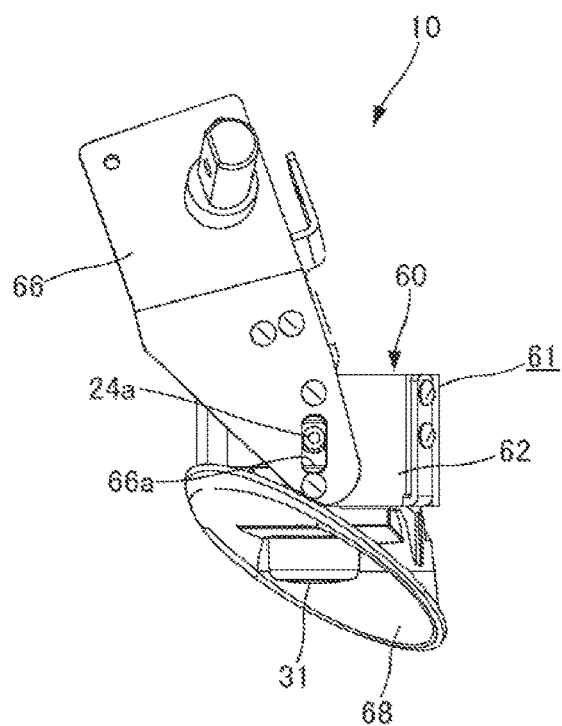
FIG. 32 is a plan view showing a bracket of a reading lamp according to an embodiment of the present invention.
Figure 33:
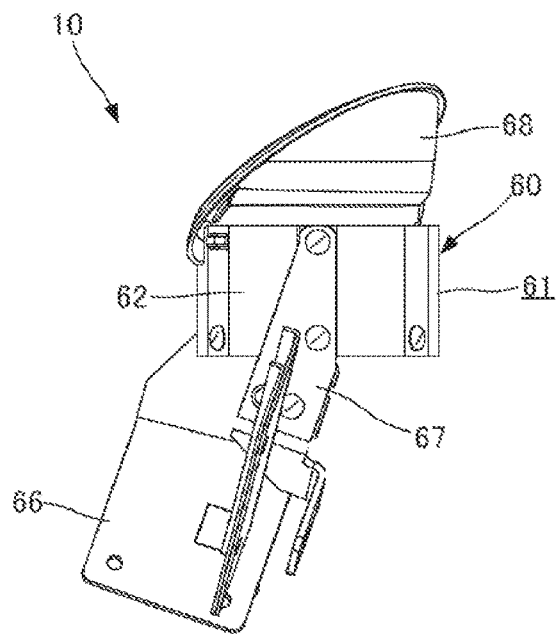
FIG. 33 is a bottom view showing a bracket of a reading lamp according to an embodiment of the present invention.

The back wall 64 walls up the back side of the base 20 of the lamp body 11, however, it is not formed in the shape of a disk on the whole, but is configured such that a plurality of supporting plates are radially extended from the central portion. In the central portion of this back wall 64, there is provided a receiving part 65, with which the tip of the leg part 22, being provided on the back side of the base 20, is engaged. As shown in FIG. 29, the receiving part 65 is formed by fitting a gromet made of a resin into a round hole produced in the central portion of the back wall 64. However, the configuration of the receiving part 65 is not limited to this, and any other configuration may be provided, so long as it allows the tip of the leg part 22 to be used as a fulcrum, being engaged therewith.

The lamp body 11, which has been accommodated in the housing part 61, can be rocked in order to adjust the irradiation direction of the LED 41 with the use of the tip of the leg part 22, being engaged with the receiving part 65, as a fulcrum. Herein, although, with the lamp body 11, the orientation of the opening part 31 can be changed in a variety of directions, such as the vertical, horizontal, and oblique ones, with the use of the tip of the leg part 22 as a turning center, however, in the present embodiment, the opening part 31 is guided within the guide opening 63a, being extended in a vertical direction. Therefore, the displacement of the lamp body 11 is restricted to rocking in a vertical direction with the tip of the leg part 22 being used as a turning center, whereby the irradiation direction of the LED 41 can be adjusted vertically.

As described above, in the inside of the housing part 61, the outer periphery of the cover 30 of the lamp body 11 is slidably butted against the inner side of the front wall 63, and in addition, the outer periphery of the entire lamp body 11 is surrounded by the outer periphery wall 62, further, the tip of the leg part 22, being protruded from the base 20 of the lamp body 11, being engaged with the receiving part 65 of the back wall 64. In this way, the lamp body 11 is supported between the front wall 63 and the back wall 64 of the bracket 60 so as to be displaceable with the tip of the leg part 22 being used as a fulcrum, the position thereof being held by the friction force, which is given in the supported state.

Figure 26:
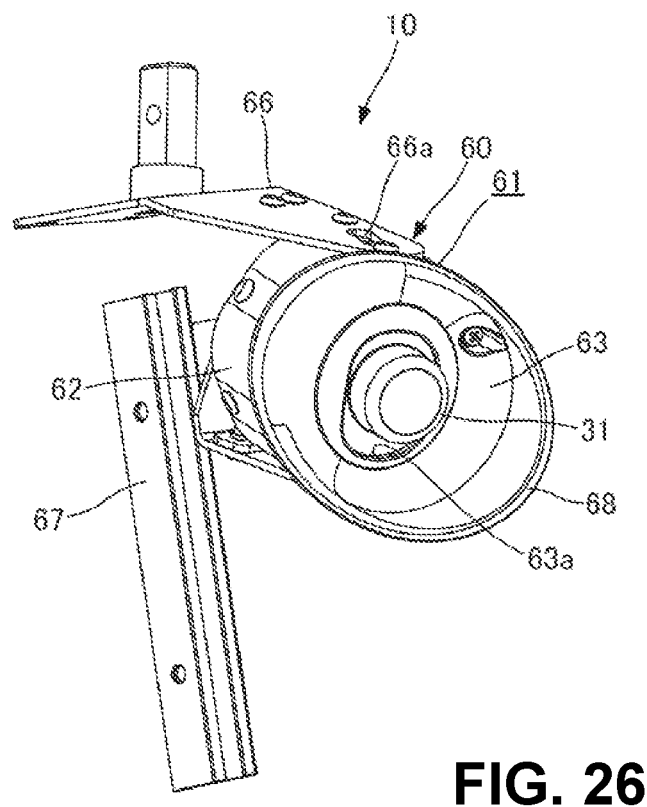
FIG. 26 is a perspective view showing a bracket of a reading lamp according to an embodiment of the present invention.
Figure 27:
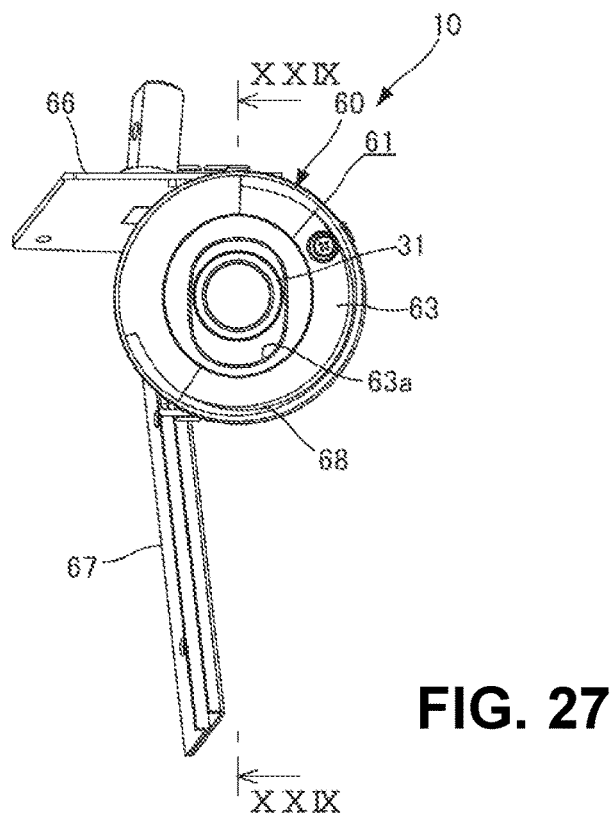
FIG. 27 is a front view showing a bracket of a reading lamp according to an embodiment of the present invention.
Figure 28:
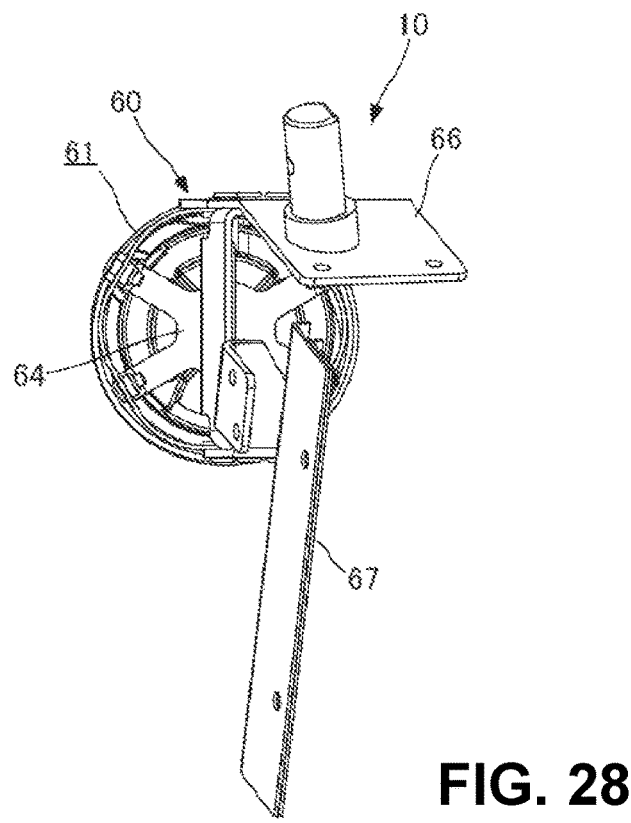
FIG. 28 is a back view showing a bracket of a reading lamp according to an embodiment of the present invention.

In addition, besides the opening part 31 of the lamp body 11 being guided within the guide opening 63a of the bracket 60, the locating pin 24a in the base 20 is also guided by an elongated hole 66a, being provided for a later-described mounting part 66 (see FIG. 26). However, the guidance of the locating pin 24a by the elongated hole 66a is not always needed, the locating pin 24a and the elongated hole 66a mainly playing a role as components allowing the top and bottom portions of the lamp body 11 to be easily identified.

The mounting parts 66 and 67 of the bracket 60 are to be fixed to the frame inside of the backrest 3, being configured as components separate from the housing part 61 and retrofitted thereto. The mounting parts 66 and 67 are formed of a metallic material, being worked to a variety of sizes and shapes in accordance with the location and shape of the frame, to which they are mounted in the inside of the backrest 3. The number of mounting parts 66 and 67 is not limited to two. As an ancillary structural element, rather than a separate part like the mounting parts 66 and 67, an eaves part 68 is provided on the side of the front wall 63 in the housing part 61. This eaves part 68 is a portion for concealing a gap that may be produced in the mounting place, depending upon the geometry of the surface of the backrest 3, in which the reading lamp 10 is disposed.

<Light Distribution Control of Illumination Lens 50, 50A>

Next, the optical characteristics of the illumination lens 50 will be explained. As shown in FIG. 1, with the present illumination lens 50, the lens body 51 distributes the light incident from the LED 41 in a predetermined direction or range. The light from the LED 41 is efficiently taken in into the inside of the lens body 51 from the incident face 510, being provided in a recessed manner in the bottom apex part of the lens body 51. Herein, the light from the LED 41 is advanced straight or bent to be passed through the inside of the lens body 51 in accordance with the angle with respect to the incident face 510.

More specifically, the incident face 510 is comprised of a first incident face 511, providing a bottom face of the recessed part, and a second incident face 512, providing a side face of the recessed part, both incident faces being different from each other in the light distribution characteristics. Thereby, the light from the LED 41 can be efficiently utilized. The light incident from the first incident face 511 is advanced straight or bent so as to be passed through an internal region of the lens body 51 apart from the reflection face 520, and emitted to the outside from the inner region 531 of the emission face 530.

In addition, the light incident from the second incident face 512 is advanced straight or bent toward the predetermined range 521, being closer to the bottom apex part, within the reflection face 520 in the lens body 51. Then, the light, which has been totally reflected in the predetermined range 521 of the reflection face 520, is condensed in a direction approximately in parallel with the optical axis L of the LED 41, being emitted to the outside from the outer region 532 of the emission face 530.

In this way, the second incident face 512 refracts the light from the LED 41 toward the reflection face 520, however, it will not refract the light toward the entire area of the reflection face 520, but will distribute the light only in the predetermined range 521, which is closer to the bottom apex part. With such a method of light distribution control, even if the passenger obliquely views the emission face 530, which closes the opening part 31, even the predetermined range 521, being located in the deeper area of the reflection face 520, will not come into view, so long as the passenger does not intentionally peek deep into the lens body 51. Therefore, within the total reflection face 520 of the lens body 51, the upper portion 522 alone, from which the light will not be reflected, will normally enter the visual field, whereby uncomfortable glare can be suppressed.

By the way, as the irradiation range of the light that is to be provided by the reading lamp 10, a quadrangle, corresponding to the shape of a magazine read by the seated person or the seat table, will be sufficient, however, with the conventional general reading lamp, light distribution in a circular shape, which includes a quadrangle, has been performed. With such light distribution in a circular shape, the distribution of light in the segment between the chord and the arc, which is produced on the outside of each side of a quadrangle inscribed in the circle, will be surplus.

Especially with the reading lamp 10, which is applied to the seat 1 for use in a railroad vehicle, such surplus light distribution has presented a problem, such as it being directed toward the aisle on the lateral side of the seat 1 or the passenger on the front seat. Then, instead of using a method for obstructing the surplus light, by adapting the illumination lens 50 itself to devise a illumination lens 50A for modifying the irradiation range such that the light is originally distributed in a quadrangle, as described above, the light from the LED 41 can be efficiently utilized without wasting it.

More specifically, the outer periphery of the lens body 51A has four side faces 523, which are inclined at an equal angle in four directions from the bottom apex part thereof. With such reflection face 520A, which is provided on the inner side of each side face 523, the light, having reached from the second incident face 512 of the incident face 510, can be condensed into a quadrangle (square), whereby the light distribution from the emission face 530 can be performed for a quadrangle (square).

<Characteristic Action of Reading Lamp 10>

Next, the characteristic action of the reading lamp 10 according to the present embodiment will be explained.

As shown in FIG. 29, on the back side of the base 20 of the lamp body 11, the leg part 22 is protruded, the tip of this leg part 22 being engaged with the receiving part 65 in the housing part 61. The lamp body 11 can be rocked in the housing part 61 with the use of the tip of the leg part 22 as a fulcrum, whereby the irradiation direction of the LED 41 can be adjusted. With such a lamp body 11, the entire shape need not be a sphere as with the conventional technology.

As shown in FIG. 25, for the base 20 of the lamp body 11, the shape may be basically a disk-like simple one, allowing the LED 41 to be disposed on the front side thereof, with only the leg part 22 being locally protruded from the reference surface on the back side thereof. Accordingly, the shape of the lamp body 11 can be made non-bulky and compact, and the bracket 60, supporting the lamp body 11, can also be downsized. With the cover 30, being assembled with the front side of the base 20, the inside space of the lamp body 11 is secured.

As shown in FIG. 29, the front wall 63 of the bracket 60 is formed such that the outer periphery of the cover 30 is slidably butted against the inner side thereof, whereby the cover 30, which provides the front side of the lamp body 11, can be positively held. In the apex part of the outer periphery of the cover 30, the opening part 31 for irradiation is cylindrically protruded, being inserted into the guide opening 63a in the front wall 63, whereby it can be rocked in a vertical direction.

In other words, the rocking of the lamp body 11 is restricted to that in a vertical direction, using the tip of the leg part 22 as a turning center, and thus the irradiation direction of the LED 41 can be adjusted only in a vertical direction. The opening part 31 of the lamp body 11 is protruded to the outside from the guide opening 63a of the front wall 63, this opening part 31 serving as an operation part for moving the lamp body 11 by hand. Herein, the tip of the leg part 22, which provides the inclination center of the base 20, also provides the turning center of the optical axis of the LED 41 as it is, and thus adjustment of the irradiation direction of the LED 41 can be carried out while recognizing it with intuition.

In addition, the base 20 is integrally formed of a metal, also serving as a heat sink. Thereby, dissipation of the heat of the LED 41, which is heated by luminescence, and the LED substrate 40 can be efficiently performed, whereby the temperature increase of the LED 41 and the LED substrate 40 can be suppressed. The LED 41, which is disposed at the center of the front side of the base 20, and the leg part 22, which plays especially as a role of a heat dissipation fin on the back side of the base 20, are matched with each other in location on the front and back sides of the base 20, and yet around the leg part 22, a plurality of ribs 25 are radially provided, whereby the heat dissipation can be further enhanced.

<Assembling of Reading Lamp 10>

Next, assembling of the reading lamp 10 according to the present embodiment will be explained.

In order to assemble the lamp body 11, which provides a critical part of the reading lamp 10, the LED substrate 40 is first disposed on the mounting face 21 of the base 20 as shown in FIG. 16 and FIG. 17. The mounting face 21 is provided with projections 27 as a locating means. By matching the projections 27 to the holes 42 in the LED substrate 40 such that they are fitted with each other, respectively, the LED 41 on the LED substrate 40 can be easily located. At this time, between the mounting face 21 of the base 20 and the LED substrate 40, a packing 43 is interposed.

Next, above the mounting face 21 of the base 20, the holder 53, holding the illumination lens 50, is disposed on the LED substrate 40 in such a way that the former is superposed on the latter. Since the holder 53 is also provided with hole parts 55, into which the respective projection 27 are to be fitted, the holder 53 and the illumination lens 50 can also be easily located. At this time, there is no need for the holder 53 being bonded onto the LED substrate 40 or the illumination lens 50 being bonded to the holder 53.

Finally, the cover 30 is assembled to the base 20 in such a way that the latter is covered with the former from above the holder 53 of the illumination lens 50. Herein, the opening edge 33 of the cover 30 is matched to the outer periphery edge of the flange 24 of the base 20, the engaging parts 34 on the cover 30 being snap-fit engaged with the engaged parts 26 on the base 20, thereby they being fixed to each other. Therefore, in assembling the lamp body 11, there is no need for using a fixing means such as an adhesive of a screw, and the assembly thereof can be made easily by simply utilizing the respective structures of the base 20 and the cover 30.

Herein, how the above-mentioned snap-fit engaging is carried out will be explained in detail: as shown in FIG. 25, with the engaging claw, which provides the engaging part 34 of the cover 30, the claw tip thereof is expanded such that it gets on the outer periphery edge of the flange 24 of the base 20, while being elastically deformed. Then, when the claw tip of the engaging part 34 has reached the engaged groove, which provides the engaged part 26, the engaging claw is fitted into the engaged groove, while being returned to the original state, thus it completing the snap-fit engaging.

In this way, simply by making an operation of matching the cover 30 to the base 20 such that the former covers the latter, the snap-fit engaging will be completed in due course in association with such operation with no need for making an extra operation, such as separately deforming the engaging part 34 with the use of a tool, or the like. Yet, with the illumination lens 50 in the holder 53, the portion above the shoulder part 52 of the outer periphery thereof is fitted to the inner periphery of the opening part 31 of the cover 30, with the top face of the shoulder part 52 being engaged with the stepped face of the shoulder part 32 of the inner periphery of the opening part 31. In such a state, the lens body 51 is held between the holder 53 and the opening part 31.

In the assembled lamp body 11, not only the illumination lens 50 and the holder 53, but also the LED substrate 40 and the packing 43 are held in place, being engaged with each other. Thereby, simply by assembling the base 20 with the cover 30, the component parts provided in the inside thereof can be fixed in the respective proper locations with a pressing force, being generated as a result of engaging with each other. In addition, the emission face 530 of the illumination lens 50 is matched to the opening part 31 to block it, and thus there is no need for separately preparing such a part as a transparent protection cover to cover the opening part 31.

<Use of Reading Lamp 10>

The lamp body 11, which has been thus assembled, is accommodated in the housing part 61 of the bracket 60 as described above for completion of a reading lamp 10. In this way, the lamp body 11 is handled as one unit of the reading lamp 10, together with the bracket 60. Then, the reading lamp 10 is fixed to the frame in the backrest 3 of the seat 1 through the mounting parts 66 and 67 of the bracket 60 to thereby be offered to use by a seated person.

When the reading lamp 10 is to be used, the LED 41, which is the light source, is turned on by means of a switch (not shown). Then, for adjusting the irradiation direction of the LED 41, a finger is hooked on the opening part 31, being protruded to the outside of the housing part 61, to press it with an operating force exceeding the above-mentioned friction force, which holds the lamp body 11 in a stationary state. At this time, the lamp body 11 is rocked in a vertical direction with the tip of the leg part 22 of the base 20 being used as the turning center, and thus by leaving the hand from the opening part 31 at the point of time when it has been rocked to the desired irradiation direction, the lamp body 11 can be stopped in the relevant position.

Heretofore, the embodiment of the present invention has been described with reference to the drawings, however, the specific configuration is not limited to that of the embodiment as described above, and various changes and modifications may be included in the present invention, so long as they do not depart from the spirit and scope thereof. For example, for the lenses for illumination 50 and 50A, not only the entire geometry, but also the incident face 510, the reflection faces 520 and 520A and the predetermined range 521 thereof, and the specific geometry and configuration of the emission face 530 are not limited to those shown, but can be altered as appropriate.

In addition, the lenses for illumination 50 and 50A can be utilized as an optical part for various lighting devices other than the reading lamp 10. In addition, the seat 1, being provided with a reading lamp 10, including an illumination lens 50 or 50A, is not limited to that for use in a railroad vehicle, and may be a seat to be installed in an airplane, a ship, or the like. In addition, instead of being directly provided in the seat 1, the reading lamp 10 may be provided in such a place as the ceiling or the side wall such that it illuminates the seat 1.

In addition, the specific geometry of a component constituting the reading lamp 10, such as the lamp body 11 or the bracket 60, is not limited to that illustrated. In addition, for the LED 41 and the substrate 40 thereof, being contained in the lamp body 11, those which have various configurations other than illustrated may be adopted. In addition, the adjustability of the irradiation direction of the light source is not limited to the vertical direction, and may be adapted such that it is the horizontal direction or any specific angular direction as required.

Further, with the lamp body 11, the cover 30 is provided with the engaging part 34, while the base 20 being provided with the engaged part 26, however, as an inverted aspect of the present embodiment, it may be configured such that the cover 30 is provided with the engaged part 26, while the base 20 being provided with the engaging part 34. Herein, the engaging part 34 is not limited to a claw-like one, and the engaged part 26 is not limited to a groove-like one into which the above-mentioned claw is fitted.

The illumination lens of the present invention is widely applicable also to various illuminators other than the reading lamp as an optical part thereof.

Reference numeral 50, 50A denotes a lens; 51, 51A a lens body; 510 an incident face; 511 a first incident face; 512 a second incident face; 520, 520A a reflection face; 521 a predetermined range; 522 an upper portion; 523 a side face; 530 an emission face; 531 an inner region; 532 an outer region; 52 a shoulder part; 53 a holder; 1 a seat; 2 a seat part; 3 a backrest; 10 a reading lamp; 11 a lamp body; 20 a base; 21 a mounting face; 22 a leg part; 26 an engaged part; 30 a cover; 31 an opening part; 32 a shoulder part; 33 an opening edge; 34 an engaging part; 40 an LED substrate; 41 an LED; 60 a bracket; 61 a housing part; 62 an outer periphery wall; 63 a front wall; 64 a back wall; and 65 a receiving part; and 66, 67 a mounting part.

What is claimed is:

1. An illumination lens for distributing light from a light source comprising:
   a lens body having an incident face, a reflection face, and an emission face; and
   a mounted part for attaching the lens body to a mating component,
   wherein said incident face is formed at a bottom apex part of the lens body to receive light from the light source,
   said reflection face is formed on an outer periphery of the lens body to reflect light from the incident face,
   said emission face is formed at an upper end of the lens body to emit light to an outside of the lens body,
   said mounted part is formed on the outer periphery of the lens body at a two-third of a whole height of the lens body from the bottom apex part thereof,
   said incident face is configured to distribute light to a predetermined range of the reflection face situated at a lower portion of the reflection face adjacent to the bottom apex part, and said incident face is configured not to distribute light to an upper portion of the reflection face adjacent to the emission face and including a location where the mounted part is formed.

2. The illumination lens according to claim 1, wherein said lens body has a plurality of side faces extending from the bottom apex part to a halfway point of the predetermined range, and each of said side faces has a cross section orthogonal to an axis thereof having a polygonal shape so that the emission face emits light in an irradiation range having an outline of the polygonal shape.

3. The illumination lens according to claim 1, wherein said incident face includes a first incident face as a bottom face and a second incident face as a side face surrounding the first incident face, said first incident face is configured to guide light through the lens body so that light is emitted from an inner region of the emission face, and said second incident face is configured to guide light to the predetermined range of the reflection face so that light is emitted from an outer region of the emission face.

4. The illumination lens according to claim 1, wherein said lens body constitutes a reading lamp.

\* \* \* \* \*